(12) United States Patent
Nevins et al.

(10) Patent No.: US 11,674,756 B2
(45) Date of Patent: *Jun. 13, 2023

(54) MODULAR COUNTERFLOW COOLING TOWER

(71) Applicant: Evapco, Inc., Taneytown, MD (US)

(72) Inventors: Scott Nevins, Gettysburg, PA (US); Jennifer Hamilton, Frederick, MD (US)

(73) Assignee: Evapco, Inc., Taneytown, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/550,030

(22) Filed: Dec. 14, 2021

(65) Prior Publication Data

US 2022/0276007 A1 Sep. 1, 2022

Related U.S. Application Data

(63) Continuation of application No. 16/592,026, filed on Oct. 3, 2019, now Pat. No. 11,199,362.

(Continued)

(51) Int. Cl.
*F28C 1/02* (2006.01)
*F28C 3/08* (2006.01)
(Continued)

(52) U.S. Cl.
CPC ............... *F28C 1/02* (2013.01); *F28C 3/08* (2013.01); *F28F 25/00* (2013.01); *F28F 25/04* (2013.01); *F28F 25/10* (2013.01)

(58) Field of Classification Search
CPC ..... F28C 1/02; F28C 3/08; F28F 25/00; F28F 25/04; F28F 25/10
(Continued)

(56) References Cited

U.S. PATENT DOCUMENTS 4,913,710 A * 4/1990 Reverdy ............... F28C 1/02
55/440
10,254,057 B2 * 4/2019 Speckin ............... E04H 5/12
(Continued)

FOREIGN PATENT DOCUMENTS

CN 2823953 10/2006
CN 101398260 4/2009
(Continued)

OTHER PUBLICATIONS

Indian Office Action issued in corresponding Indian Application No. 202127016675 dated Nov. 3, 2022.
(Continued)

*Primary Examiner* — Charles S Bushey
(74) *Attorney, Agent, or Firm* — Whiteford, Taylor & Preston, LLP; Peter J. Davis

(57) ABSTRACT

A single inlet/single outlet modular counterflow cooling tower having two heat transfer sections installed atop two cold water basin sections and below three fan sections, each heat transfer section having its own water distribution system and draining into its own distinct cold water basin section. The water distribution system can provide flow over both heat transfer sections or over only a single section. The center fan support section supports the mechanical drive system for the fan and has a sealing plate at its bottom for sealing the gap between the two heat transfer sections.

17 Claims, 14 Drawing Sheets

Related U.S. Application Data

(60) Provisional application No. 62/740,606, filed on Oct. 3, 2018, provisional application No. 62/740,611, filed on Oct. 3, 2018, provisional application No. 62/740,615, filed on Oct. 3, 2018, provisional application No. 62/740,620, filed on Oct. 3, 2018.

(51) Int. Cl.
   *F28F 25/00* (2006.01)
   *F28F 25/04* (2006.01)
   *F28F 25/10* (2006.01)

(58) Field of Classification Search
   USPC .................................. 261/23.1, 30, DIG. 11
   See application file for complete search history.

(56) References Cited

U.S. PATENT DOCUMENTS

| | | | |
|---|---|---|---|
| 10,443,942 B2* | 10/2019 | Aaron | F28F 25/02 |
| 10,465,407 B2* | 11/2019 | Maurer | F28C 1/04 |
| 10,627,176 B2* | 4/2020 | Shin | F28F 25/04 |
| 11,079,187 B2* | 8/2021 | Rasmussen | F28F 25/10 |
| 11,199,362 B2* | 12/2021 | Nevins | F28F 25/00 |
| 2001/0032477 A1* | 10/2001 | Schlom | F28F 3/046 |
| | | | 62/310 |
| 2002/0024156 A1* | 2/2002 | Flaherty | F28F 21/06 |
| | | | 261/DIG. 11 |
| 2002/0195729 A1* | 12/2002 | Merrill | F28C 1/14 |
| | | | 261/36.1 |
| 2005/0006798 A1* | 1/2005 | Hegg | F28F 25/00 |
| | | | 261/112.2 |
| 2006/0196449 A1* | 9/2006 | Mockry | F28D 7/0066 |
| | | | 122/6 A |
| 2011/0210456 A1 | 9/2011 | Boyd | |
| 2017/0160015 A1* | 6/2017 | Aaron | F28F 25/12 |

FOREIGN PATENT DOCUMENTS

| | | |
|---|---|---|
| CN | 107436100 | 12/2017 |
| EP | 3249331 | 11/2017 |

OTHER PUBLICATIONS

Chinese Office Action issued in corresponding Chinese Application No. 2019800726921 dated Sep. 28, 2022.
European Search Report issued in corresponding European Application No. 19868542.2 dated Apr. 22, 2022.

* cited by examiner

MODULAR COUNTERFLOW COOLING TOWER

BACKGROUND OF THE INVENTION

Field of the Invention

The present invention relates to counterflow cooling towers for cooling hot process water.

SUMMARY OF THE INVENTION

The present invention is a modular counterflow cooling tower having a plurality of pre-fabricated modular fan sections (or modules) sitting atop a plurality of pre-fabricated modular heat transfer sections (or modules), which in turn sit atop a plurality of pre-fabricated modular cold water basin sections (or modules). According to a preferred embodiment, the modular counterflow cooling tower of the invention has three fan sections sitting atop two heat transfer sections, which in turn sit atop two cold water basin sections. According to a further preferred embodiment, each heat transfer section contains its own integral water distribution system for distributing hot process water over the heat transfer media in the respective section, and the cooled water draining from each heat transfer section falls into a separate cold water basin section. According to an alternative embodiment, the water distribution systems may be an integral part of the fan sections instead of the heat transfer sections. The device is provided with a single hot process water inlet which may be located near the bottom of the device, at a side, end or bottom of one of the cold water basin sections, near the middle of the device, in a side or end of one of the heat transfer sections, or near the top of the device, in a side or end of one of the fan sections. The inlet is connected to an inlet manifold system which provides a fluid flow path up or down to the water distribution systems of both heat transfer sections. The inlet manifold may have one or more regulators, such as valves, block-off plates, and the like, for controlling the flow of hot process water to one or the other or both of the heat transfer section water distribution systems. A single cold water outlet is provided in the bottom, side, or end of one of the cold water basin sections, with a water drain path provided from the basin without the cold water outlet to the basin with the cold water outlet. Each section may be shipped separately and quickly assembled to other sections at the assembly location. The heat transfer sections need not be connected to one-another or otherwise joined to one-another in the field, and may instead be supported entirely by the basin section directly below. According to a preferred embodiment, the center fan support section has a sealing plate running along the centerline of its bottom face in the longitudinal direction for sealing the gap between the two heat transfer sections. The fan motor and drive shaft may be assembled to the center fan section pre-shipment, or it may be shipped separately and assembled to the center fan section at the final assembly location. In operation, the fan draws air into the plenum of the cold water basin sections via air inlets provided on the external facing sides and/or ends of the cold water basin sections, up through the heat transfer media of the heat transfer sections, and out the top of the device. Air inlet louvers may be provided on the air inlets to control the flow of air drawn into the plenum or to prevent sunlight and debris from entering the cold water basin sections. Heated process water is delivered to the device via the single process water inlet and delivered to the water distribution systems located over the fill media where it is cooled in direct heat exchange with the air moving through the fill media. The cooled process water falls into the cold water basin sections where it drains to the single process fluid outlet.

Figure 1:
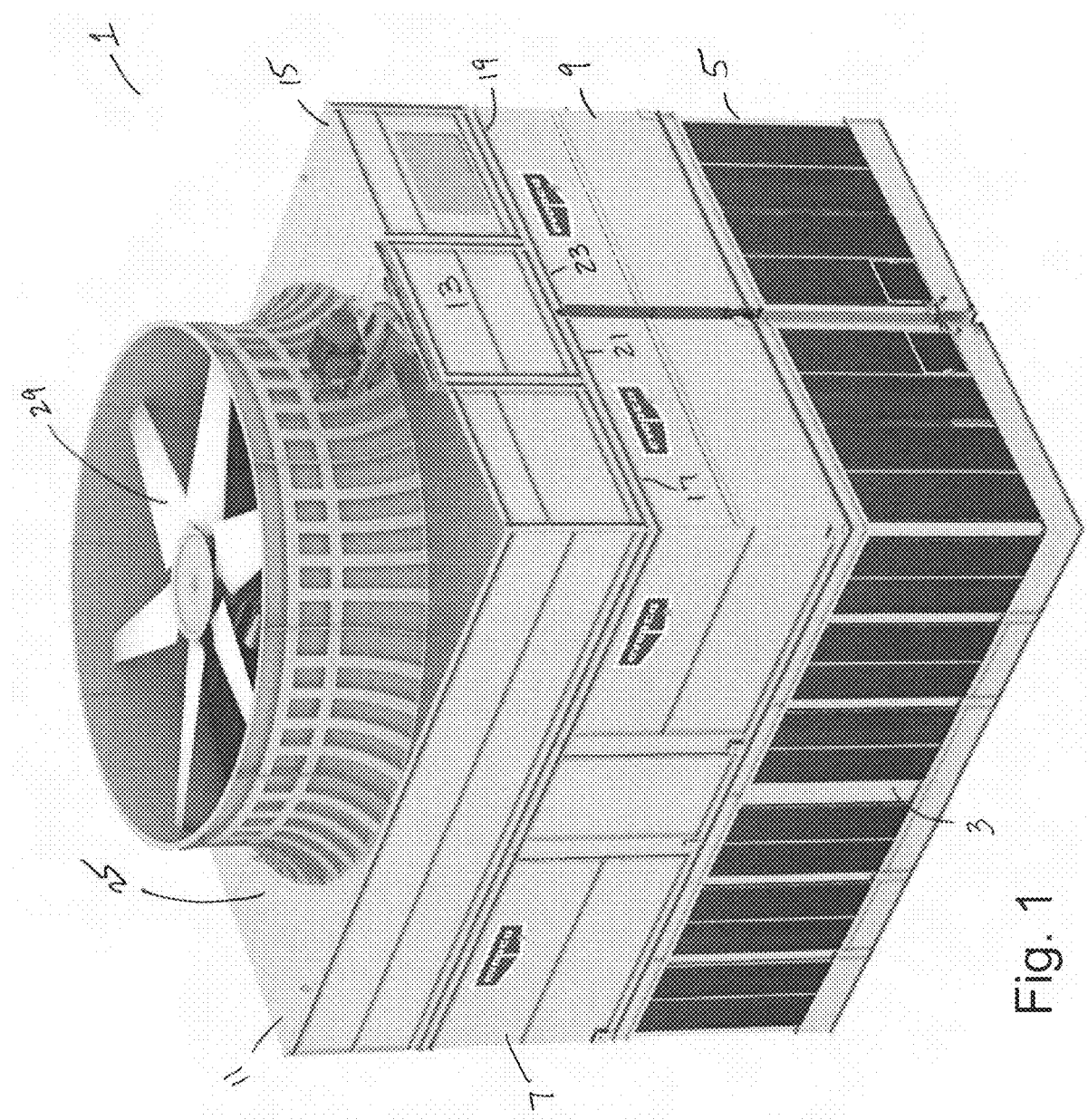
FIG. 1 is a perspective view of a modular counterflow cooling tower according to an embodiment of the invention.

Features in the attached drawings are numbered with the following reference numerals:

---

1 Modular cooling tower
3 First cold water basin
5 Second cold water basin
7 First heat transfer housing
9 Second heat transfer housing
11 First fan support section
13 Central fan support section
15 Second fan support section
17 First part of first heat transfer housing
19 First part of second heat transfer housing
21 Second part of first heat transfer housing -continued 23 Second part of second heat transfer housing
25 Top surface of fan support sections
27 Fan opening
29 Fan
31 Hot process water inlet
33 Inlet manifold system
35 Inlet Piping
37 Inlet valves
39 Basin section riser
41 First water distribution system
43 Second water distribution system
45 Heat transfer section riser
47 Water distribution header
49 Water distribution feed tube
51 Nozzles
53 Heat transfer media
55 Cold water egress passageways
57 Cold water outlet
59 Fan motor
61 Fan drive assembly
63 Sealing plate
65 Gap.

DETAILED DESCRIPTION

Figure 2:
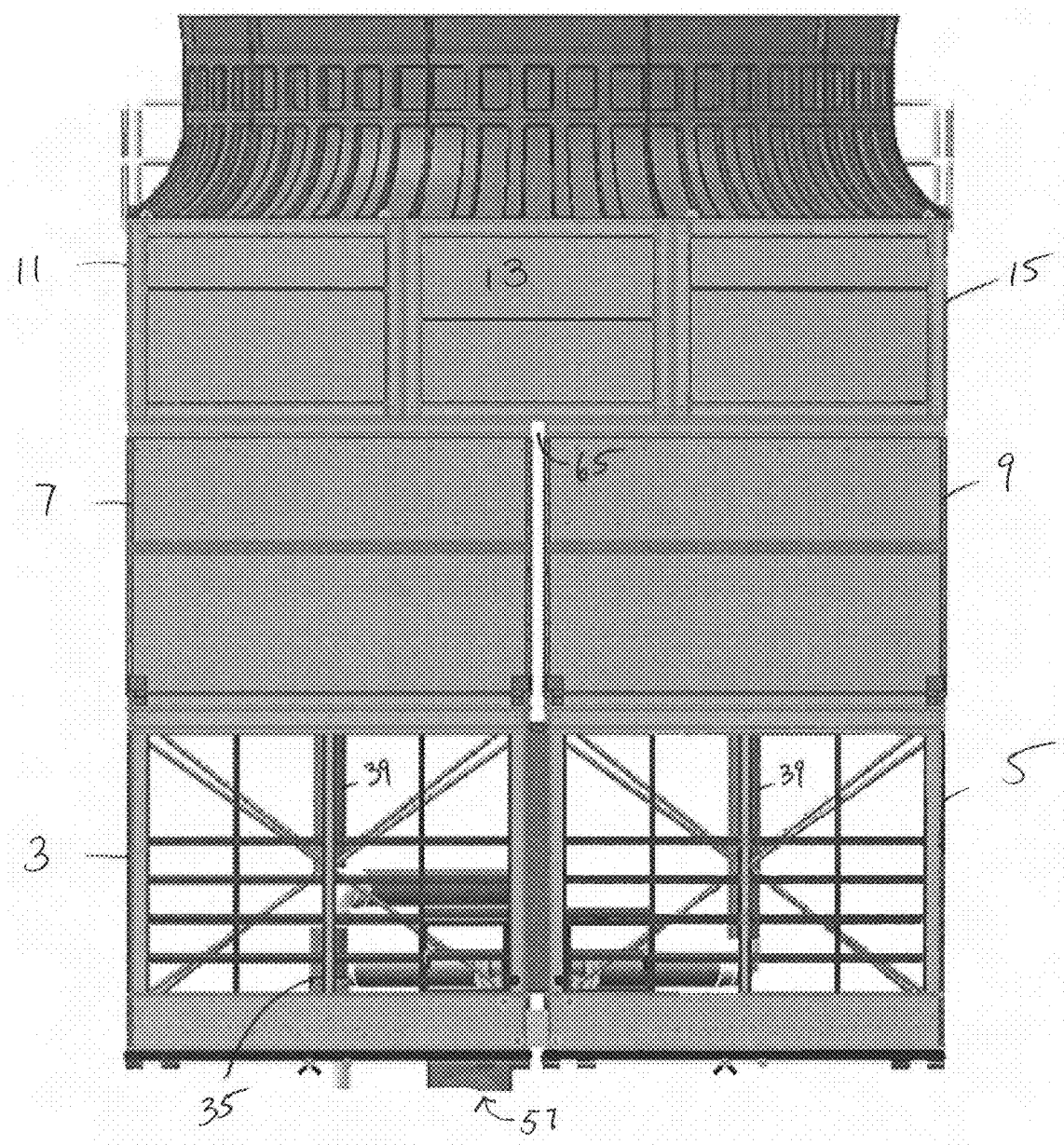
FIG. 2 is an elevational end view of a modular counterflow cooling tower according to an embodiment of the invention.
Figure 3:
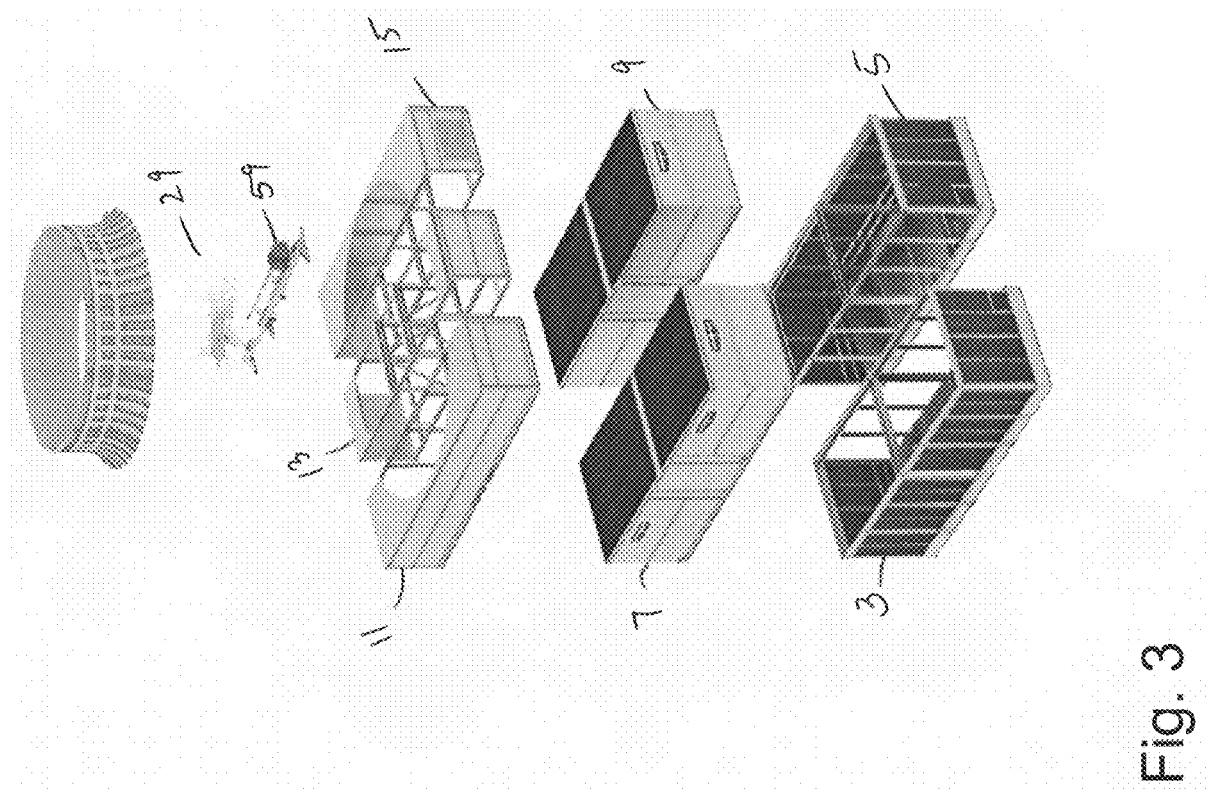
FIG. 3 is an exploded perspective view of a modular counter flow cooling tower according to an embodiment of the invention.
Figure 4:
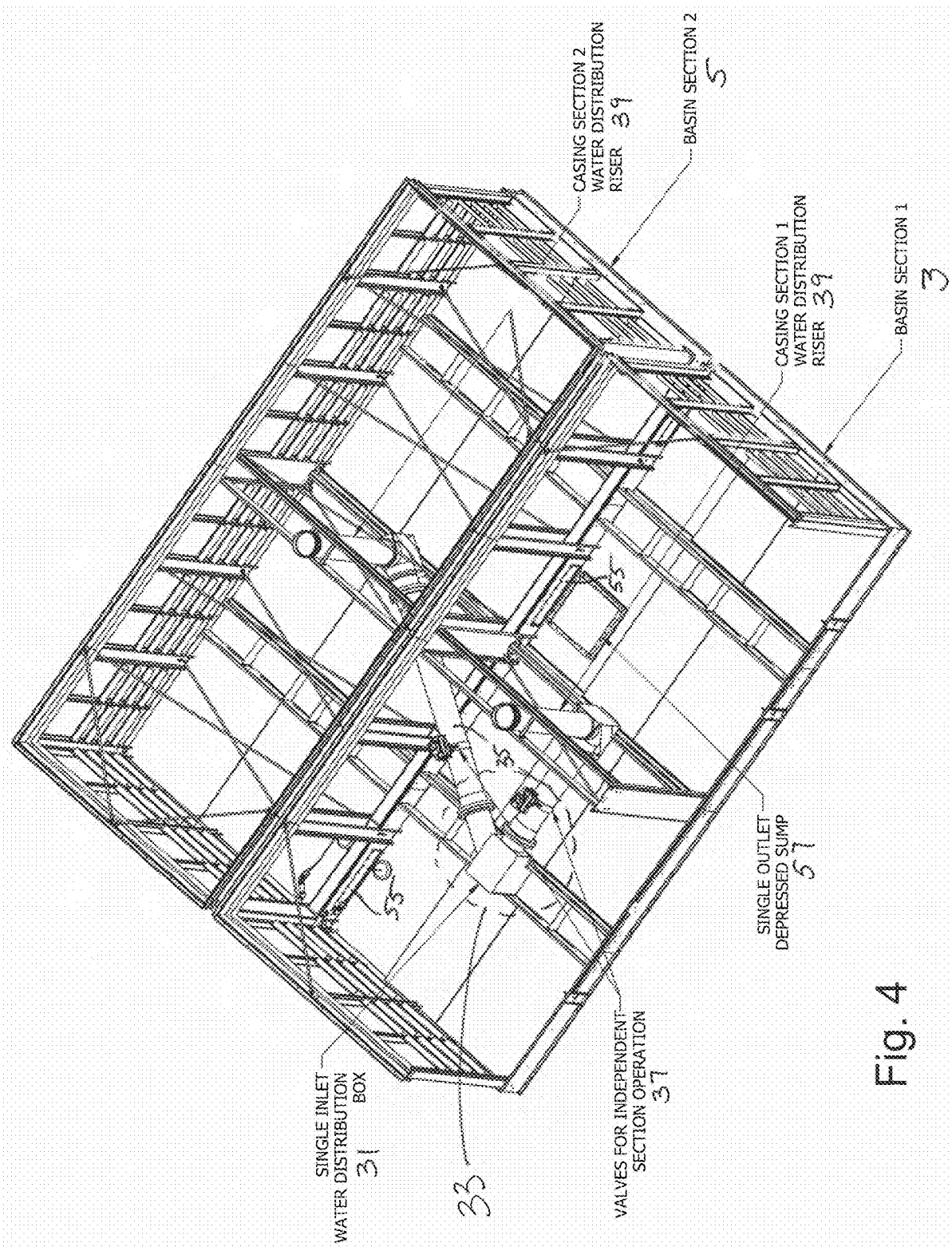
FIG. 4 is an overhead cutaway perspective view of first and second cold water basin housing according to an embodiment of the invention.
Figure 5:
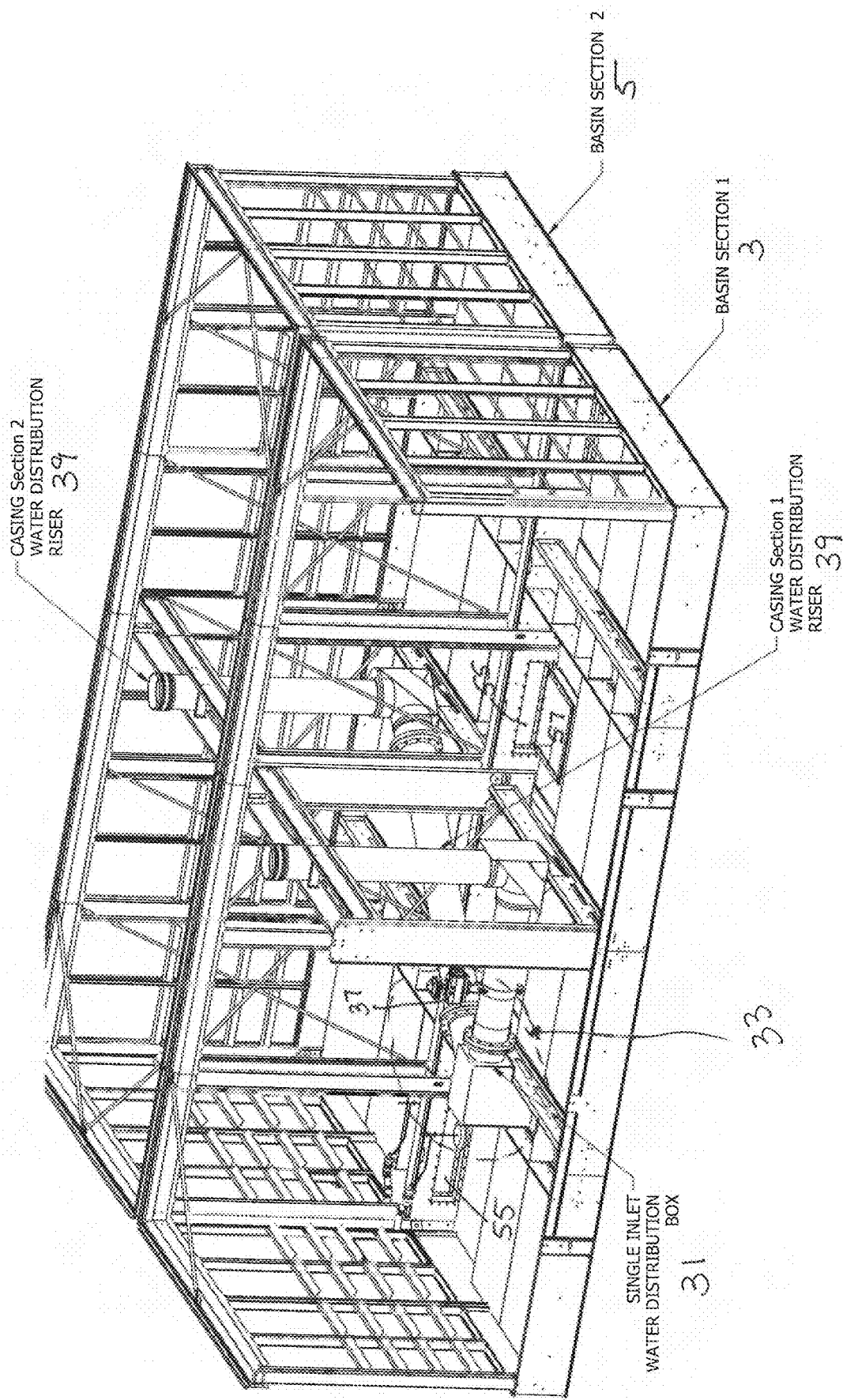
FIG. 5 is a different cutaway perspective view of the first and second cold water basin housing shown in FIG. 4.
Figure 6:
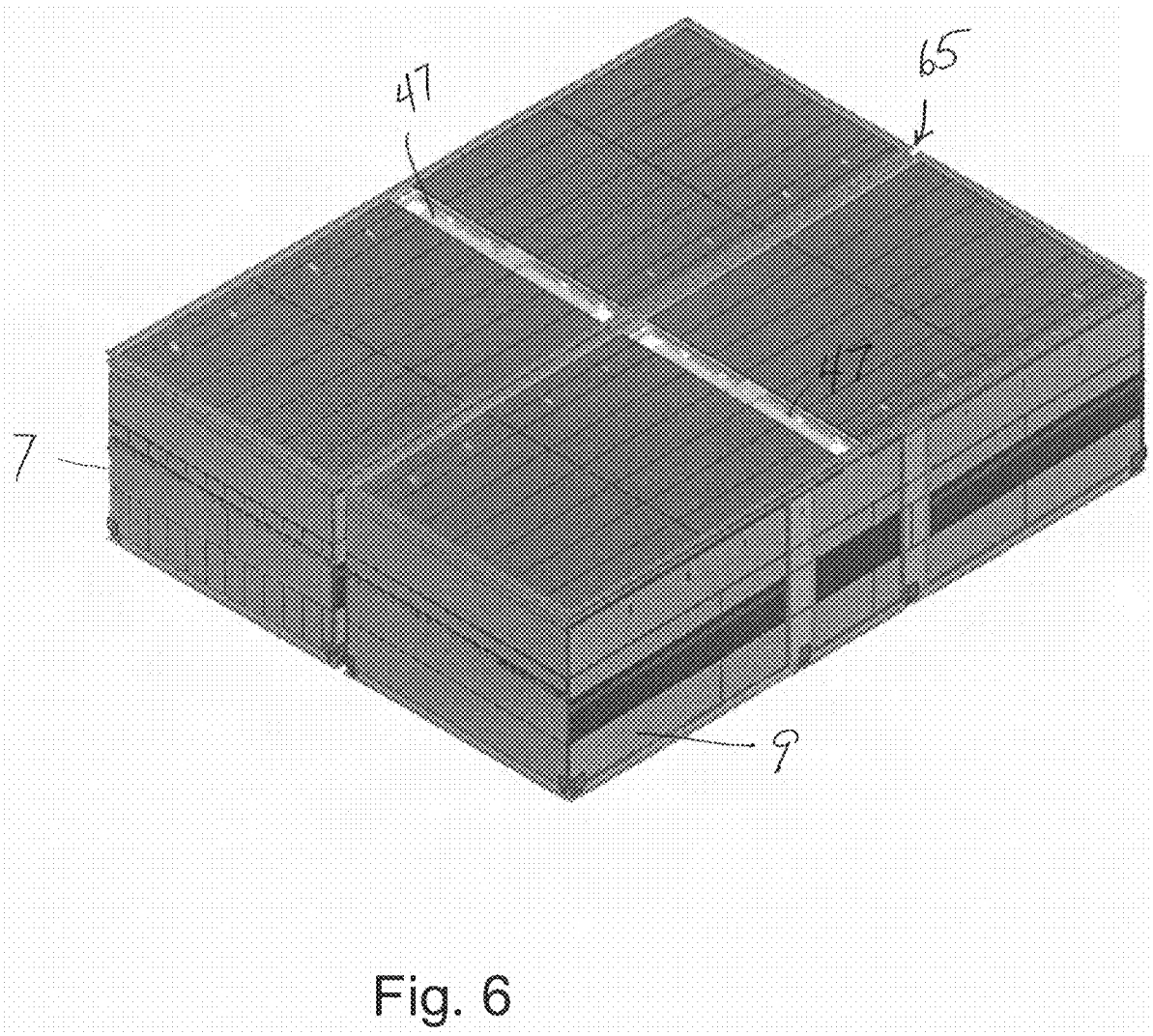
FIG. 6 is a perspective view of first and second heat transfer housings according to an embodiment of the invention.
Figure 7:
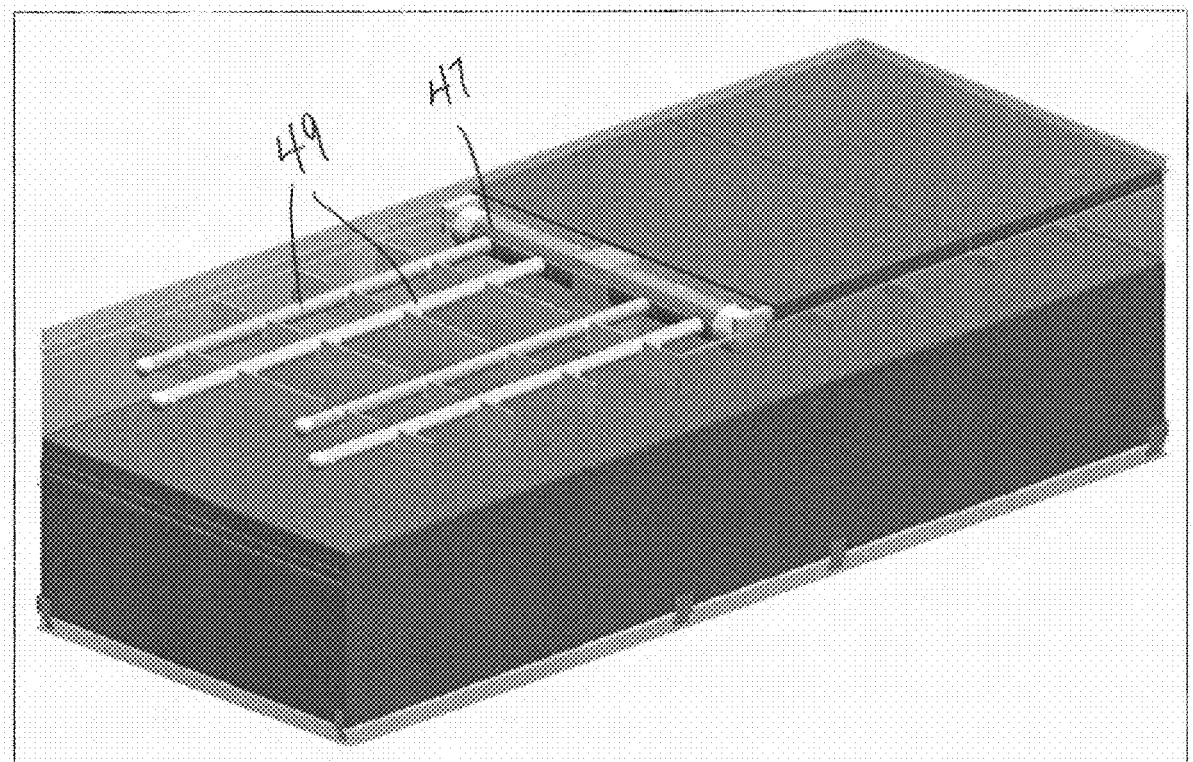
FIG. 7 is a partial cutaway perspective view of a first heat transfer housing according to an embodiment of the invention.
Figure 8:
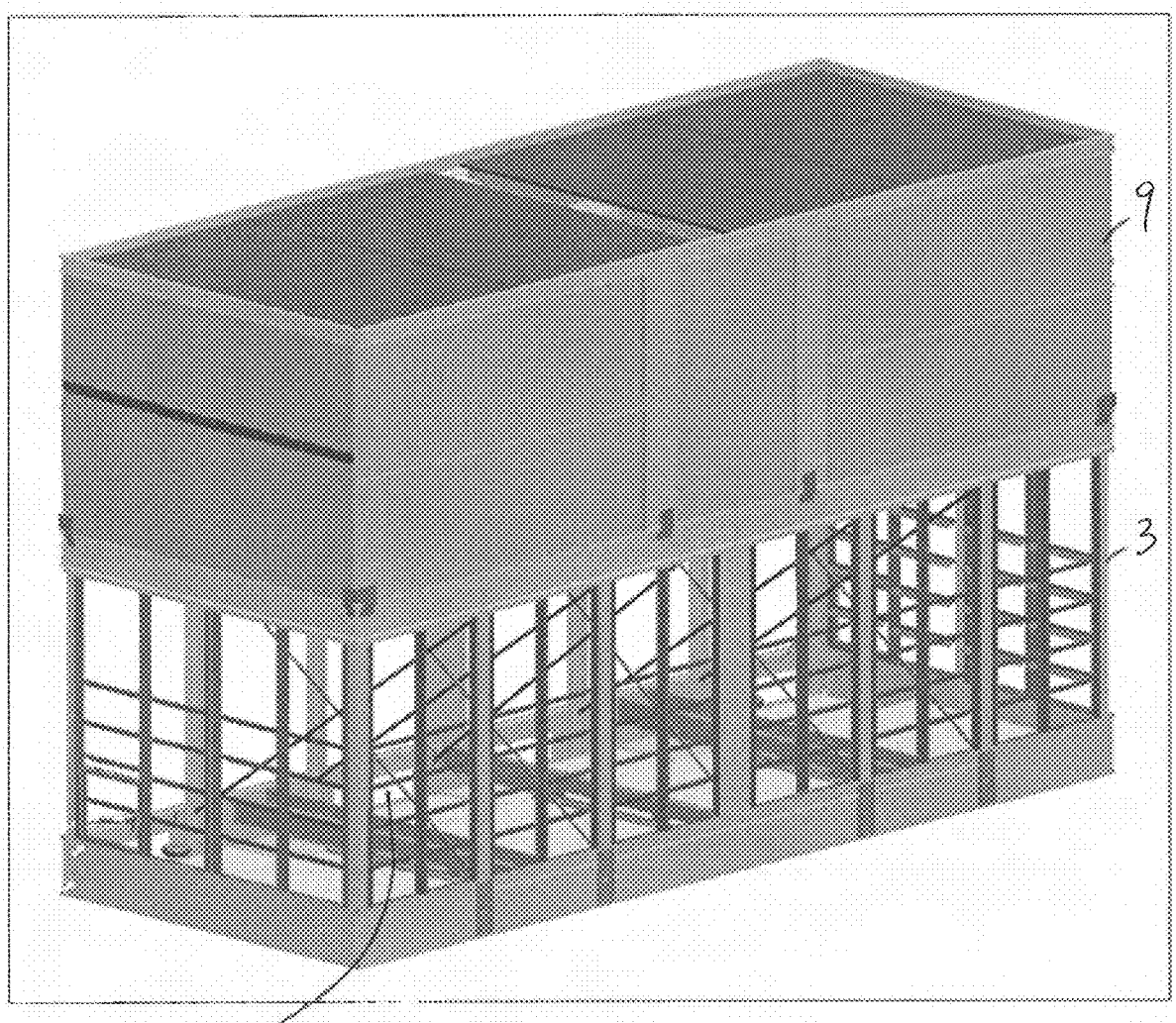
FIG. 8 is a perspective view of a first heat transfer housing sitting atop a first cold water basin housing according to an embodiment of the invention.
Figure 9:
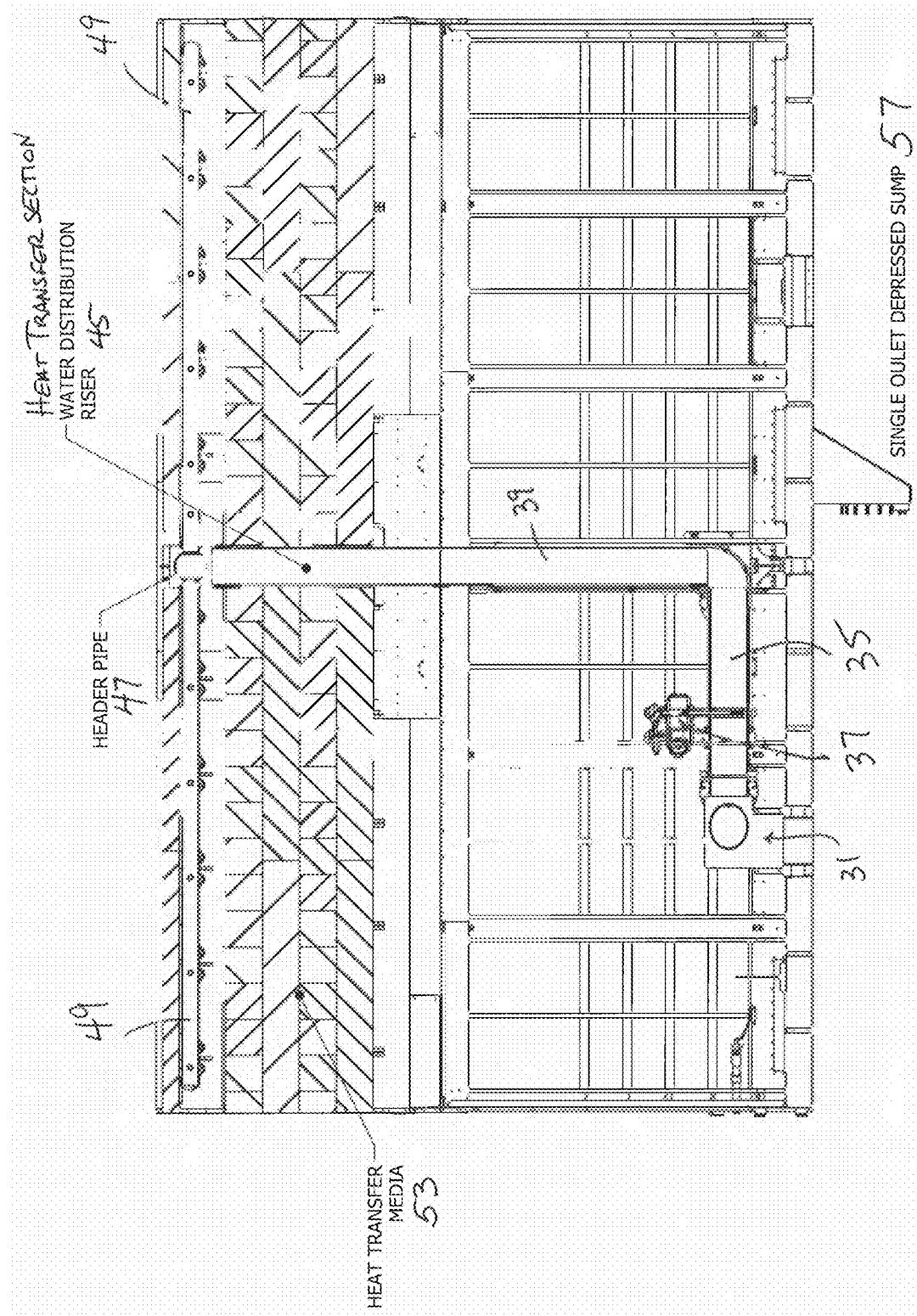
FIG. 9 is a cutaway side view of a first heat transfer housing sitting atop a first cold water basin housing according to an embodiment of the invention.
Figure 10:
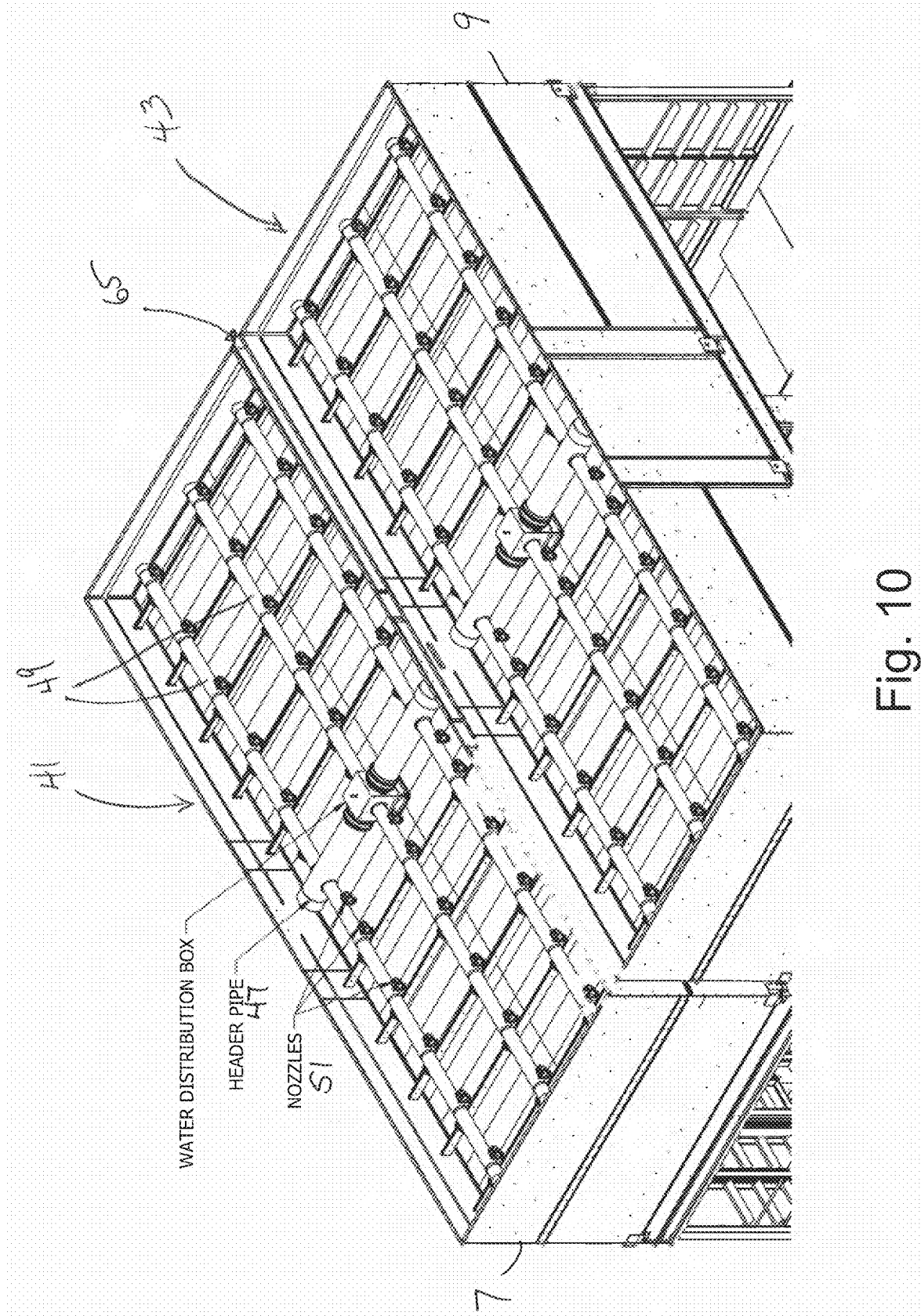
FIG. 10 is an overhead perspective view of first and second heat transfer housings according to an embodiment of the invention.

As shown in FIGS. 1-3, modular counterflow cooling towers 1 of the present invention have first and second rectangular cold water basin, or basin housings 3, 5 configured to rest on a foundation, first and second rectangular heat transfer housings 7, 9 dimensioned and configured to rest directly above respective first and second rectangular cold water basins 3, 5, and first, central, and second fan support sections 11, 13, 15, configured to rest on said first and second heat transfer sections 7, 9. First fan support section 11 preferably rests entirely on a first partial portion 17 of the first heat transfer section 7, and second fan support section 15 preferably rests entirely on a first partial portion 19 of the second heat transfer section 9. Central fan support section spans 13 both first and second heat transfer sections 7, 9, supported by second partial parts 21, 23 of the first heat transfer section 7 and the second heat transfer section 9, respectively. The combined top surface 25 of the first, second, and central fan support sections 11, 13, 15 defines a fan opening 27 that corresponds to the diameter of the fan 29, which diameter spans substantially the entire width of the modular counterflow cooling tower. Each of the first and second cold water basin housings, the first and second heat transfer housings, and the first, second, and central fan support sections are factory pre-assembled and shipped as modules to the final assembly location for final assembly into the modular counterflow cooling tower of the invention.

According to one embodiment of the invention, the modular counterflow cooling tower of the invention may have a single hot process water inlet 31, which may be located in an end, a side or a bottom of one of the first or second cold water basin housings 3, 5, in an end or side of one of the first, central or second fan support sections 11, 13, 15, or in an end or side of one of the first and second heat transfer sections 7, 9. The single inlet 31 may be connected to an inlet manifold system 33, including piping 35, for directing incoming hot process water to the first and second heat transfer housings 7, 9. Manifold system 33 may also optionally include one or more regulators such as valves 37, block-off plates, their equivalents, or other flow-interruption/direction devices for selectively directing incoming hot process water to both the first and second heat transfer housings 7, 9 or to only the first heat transfer housing 7, or to only the second heat transfer housing 9. Such regulators could be utilized for plume management, ice management or capacity control or, in the case that one heat transfer section requires maintenance, re-packing of heat transfer media.

Separate heat transfer sections also provide redundancy in the event that damage occurs to one heat transfer section. According to the invention, the damaged section can be isolated and the modular cooling tower can continue operation and provide heat rejection during repair of the damaged section.

Figure 11:
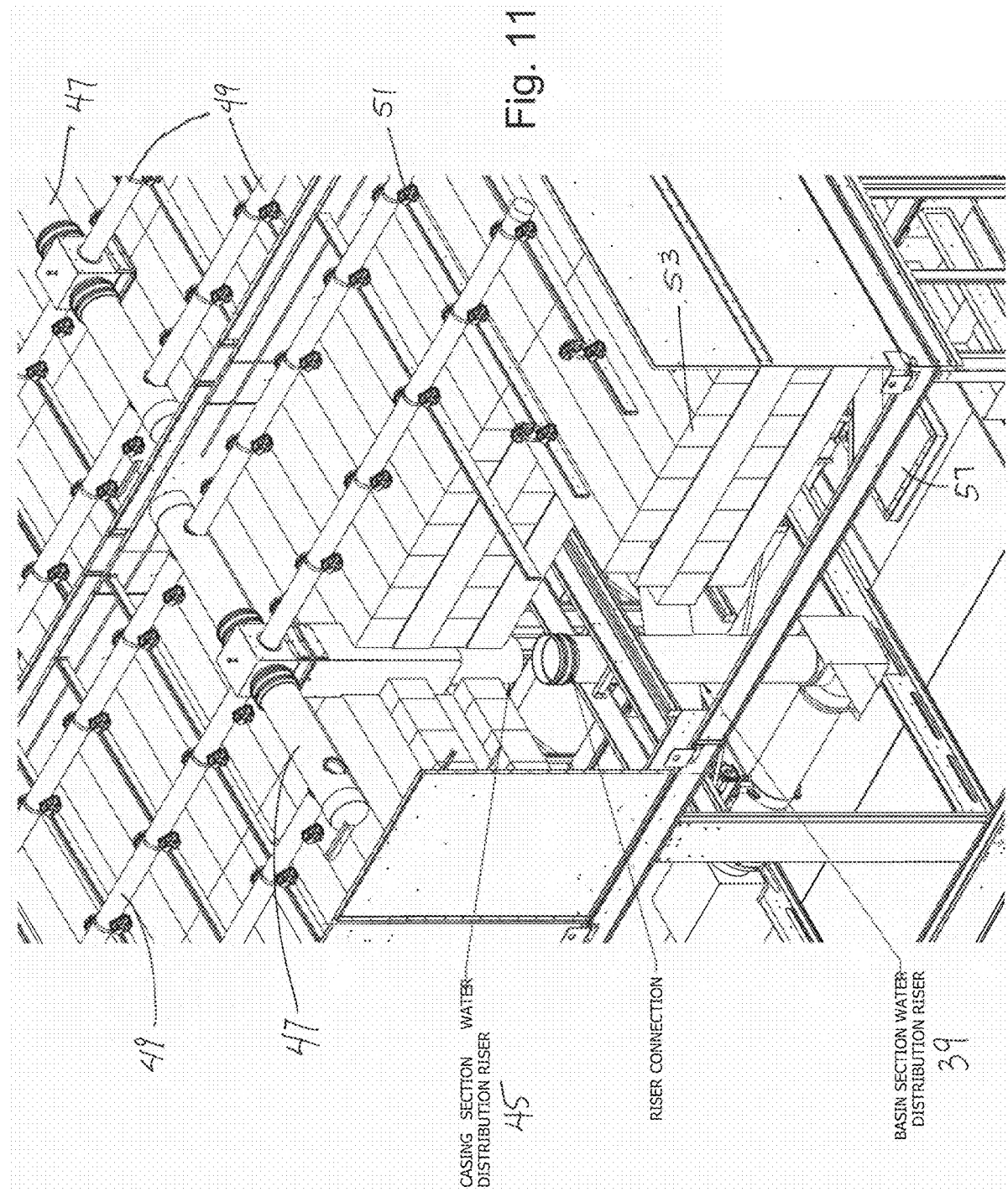
FIG. 11 is a partial cutaway perspective view of a first heat transfer housing sitting atop a first cold water basin housing according to an embodiment of the invention.
Figure 12:
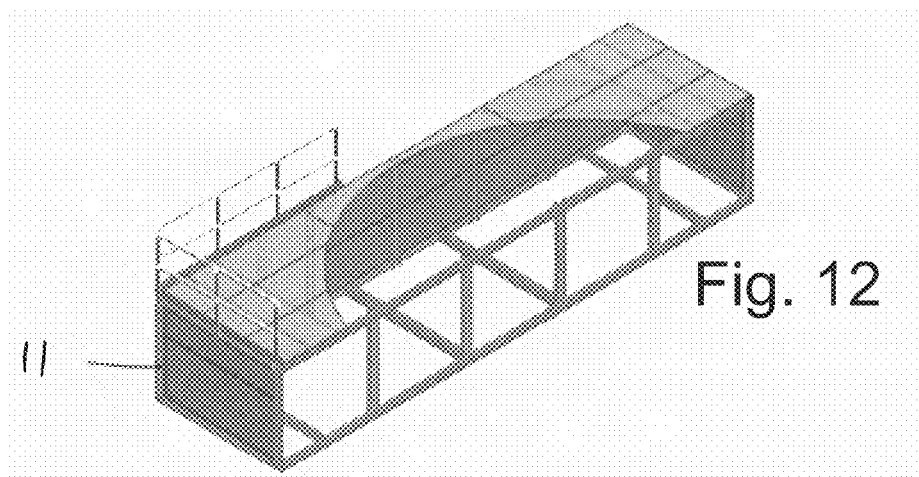
FIG. 12 is a perspective view of a first fan support section according to an embodiment of the invention.

In the case that the single water inlet 31 is located in a cold water basin housing, inlet manifold system 33 includes basin section process water risers 39 for connecting to first and second water distribution systems 41, 43 of the first and second heat transfer housings 7, 9, via respective heat transfer section process water risers 45 (see FIG. 11). The first and second water distribution systems 41, 43 may each include a header 47, to which is attached a plurality of feed tubes 49, each of which has a plurality of outlets or nozzles 51 for distribution of the hot process fluid over heat transfer media 53. When the valves 37 are dialed to allow process fluid flow to both heat transfer sections 7, 9, back pressure on the system generated by the pressurized water distribution system causes the system to self-balance the flow of process fluid to the two heat transfer sections.

Each of the modular sections described above may be independently constructed and transported to a final assembly location. At the final assembly location, the first and second cold water basin housings 3, 5 may be installed on an appropriately prepared foundation and connected to one-another so that water may pass from one cold water basin to another via one or more openings or passageways 55 between them to allow egress of water from both cold water basins via a single outlet 57.

Figure 13:
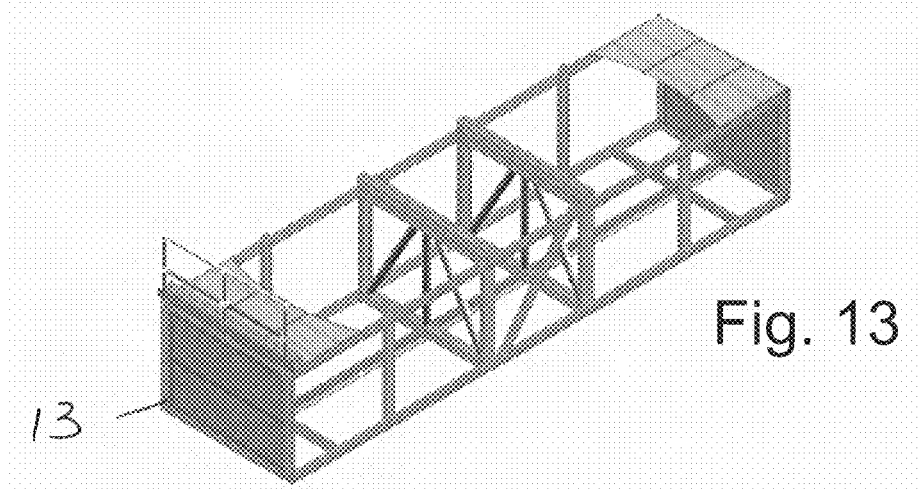
FIG. 13 is a perspective view of a center fan support section according to an embodiment of the invention.
Figure 14:
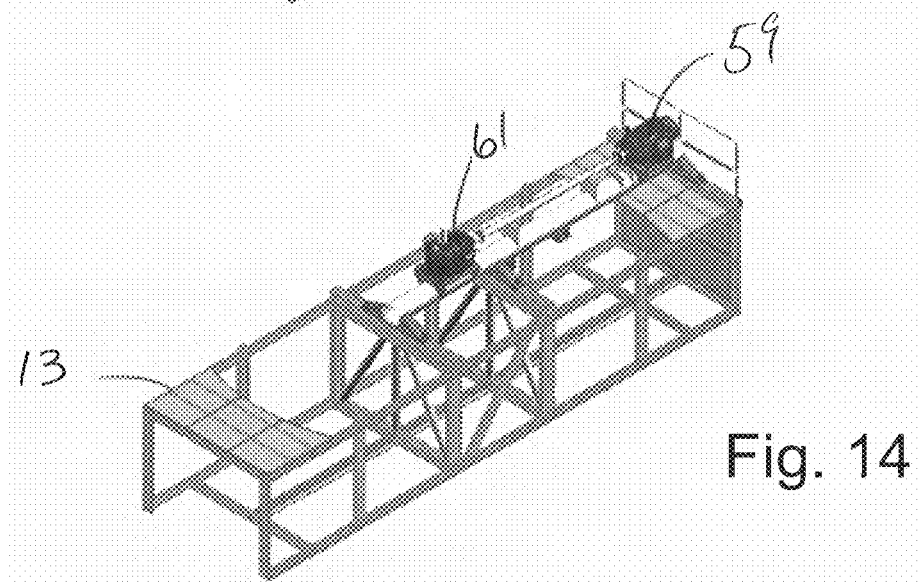
FIG. 14 is a perspective view of a center fan support section according to a different embodiment of the invention.
Figure 15:
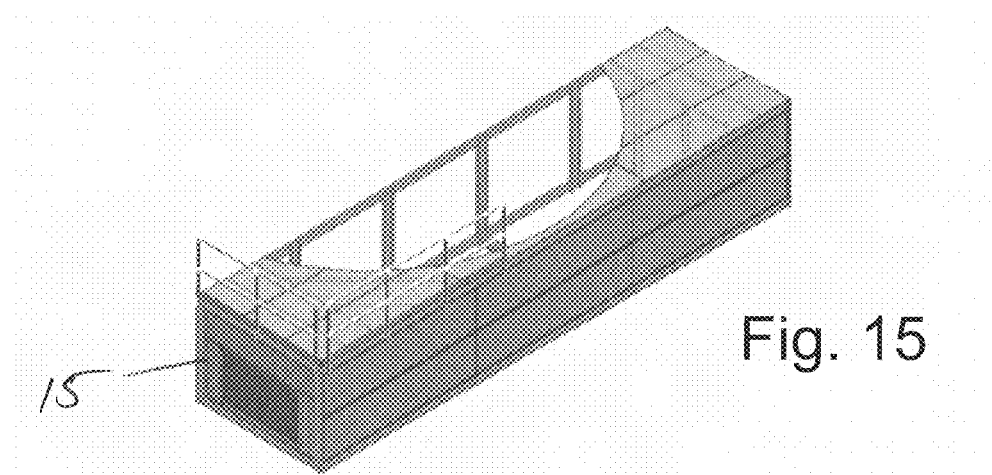
FIG. 15 is a perspective view of a second fan support section according to an embodiment of the invention.
Figure 16:
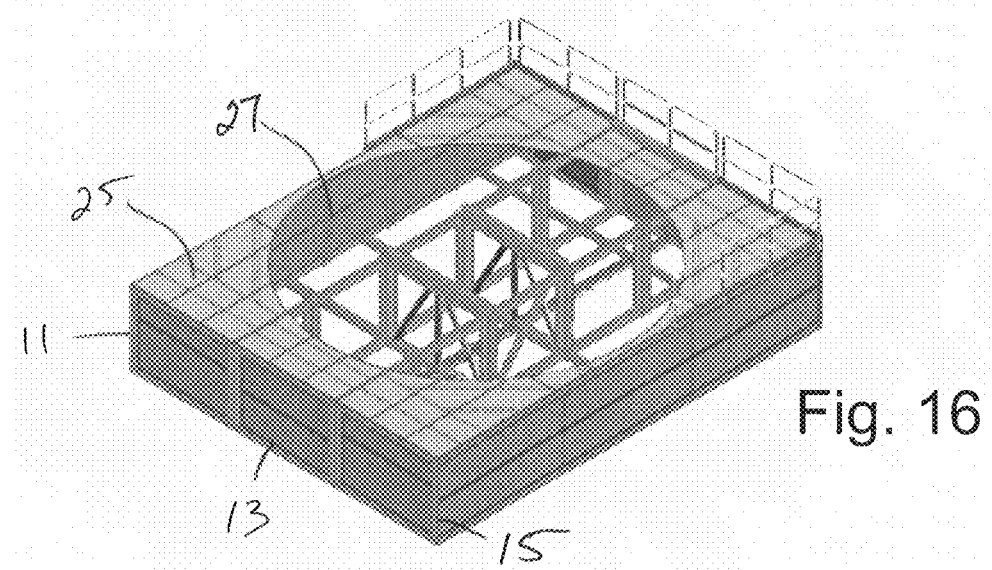
FIG. 16 is a perspective view of all three fan support sections according to an embodiment of the invention
Figure 17:
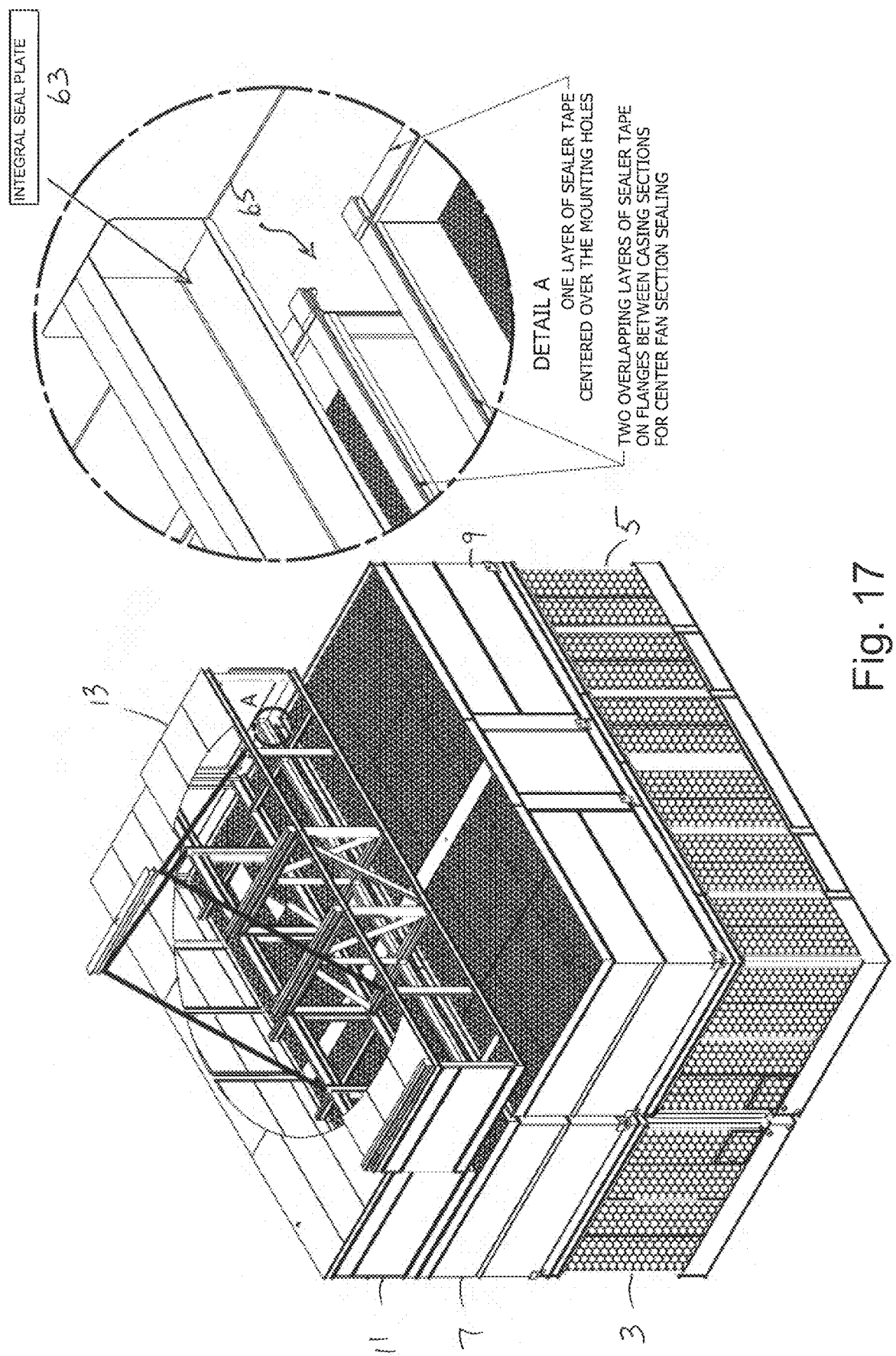
FIG. 17 is a perspective view of a partially assembled modular counterflow cooling tower according to an embodiment of the invention.

The central fan support section may be transported separately (FIG. 13) or with the fan motor 59 and drive assembly 61 attached (FIG. 14).

The first and second heat transfer housings need not be sealed, joined or otherwise connected to one-another upon final assembly in the field, simplifying assembly. The center fan section 13 may be constructed with an integral sealing plate 63 extending along the centerline of its bottom face to cover and seal the gap 65 between the two heat transfer housings.

The invention claimed is:

1. A modular counterflow cooling tower comprising:
a first cold water basin housing;
a second cold water basin housing;
a first direct heat transfer housing containing heat transfer media, said first direct heat transfer housing dimensioned and configured to rest atop said first cold water basin housing;
a second direct heat transfer housing containing heat transfer media, said second direct heat transfer housing dimensioned and configured to rest atop said second cold water basin housing;
a first fan support section dimensioned and configured to rest atop a first portion of a top face of said first direct heat transfer section,
a second fan support section dimensioned and configured to rest atop a first portion of a top face of said second direct heat transfer section,
a center fan support section dimensioned and configured to rest atop and span a second portion of said top face of said first direct heat transfer section and a second portion of said top face of said second direct heat transfer section;

a first water distribution system located above said heat transfer media in said first direct heat transfer housing;

a second water distribution system located above said heat transfer media in said second direct heat transfer housing;

a hot process water inlet located in one of said first cold water basin, said second cold water basin, said first fan support section, said second fan support section, and said center fan support section;

a cold water outlet located in one of said first cold water basin and said second cold water basin said hot process water inlet connected to said first and second water distribution systems via a water inlet manifold system.

2. A modular counterflow cooling tower according to claim 1, said center fan support section comprising a sealing plate running along a longitudinal centerline of a bottom face thereof for sealing a longitudinal gap between respective inside longitudinal edges of said first and second direct heat transfer housings.

3. A modular counterflow cooling tower according to claim 1, said hot process water inlet located in one of said first cold water basin, said second cold water basin.

4. A modular counterflow cooling tower according to claim 3, said water inlet manifold system located in one or both of said first and second cold water basins.

5. A modular counterflow cooling tower according to claim 1, said hot process water inlet located in one of said first fan support section, said second fan support section, and said center fan support section.

6. A modular counterflow cooling tower according to claim 5, said water inlet manifold system located in one or more of said first fan support section, said second fan support section, and said center fan support section.

7. A modular counterflow cooling tower according to claim 1, said hot process water inlet located in one of said first heat transfer section and said second heat transfer section.

8. A modular counterflow cooling tower according to claim 7, said water inlet manifold system located in one or more of said first heat transfer section and said second heat transfer section.

9. A modular counterflow cooling tower according to claim 1, said first and second cold water basins defining one or more cold water flow paths for passage of cold water between said first and second cold water basins.

10. A modular counterflow cooling tower according to claim 1, further comprising a fan drive system configured to be supported by said center fan support section.

11. A modular counterflow cooling tower according to claim 1, further comprising a fan dimensioned and configured to be supported by said center fan support section, said fan having fan blades what extend above said first fan support section, said second fan support section and said center fan support section.

12. A modular counterflow cooling tower according to claim 1, said water inlet manifold system including at least one regulator for selectively directing hot process water to both said first and second water distribution systems, to only said first water distribution manifold, or to only said second water distribution manifold.

13. A modular counterflow cooling tower according to claim 4, said water inlet manifold system including at least one regulator for selectively directing hot process water to both said first and second water distribution systems, to only said first water distribution manifold, or to only said second water distribution manifold.

14. A modular counterflow cooling tower according to claim 6, said water inlet manifold system including at least one regulator for selectively directing hot process water to both said first and second water distribution systems, to only said first water distribution manifold, or to only said second water distribution manifold.

15. A modular counterflow cooling tower according to claim 8, said water inlet manifold system including at least one regulator for selectively directing hot process water to both said first and second water distribution systems, to only said first water distribution manifold, or to only said second water distribution manifold.

16. A modular counterflow cooling tower according to claim 1, wherein said first and second water distribution systems are located inside said first and second heat transfer sections, respectively.

17. A modular counterflow cooling tower according to claim 1, wherein said first and second water distribution systems are located inside one or more of said first, central and second fan support sections.

\* \* \* \* \*